(12) United States Patent
Feldtkeller et al.

(10) Patent No.: US 7,894,218 B2
(45) Date of Patent: Feb. 22, 2011

(54) SWITCH-MODE CONVERTER

(75) Inventors: Martin Feldtkeller, Munich (DE); Antoine Fery, Munich (DE)

(73) Assignee: Infineon Technologies Austria AG, Villach (AT)

( * ) Notice: Subject to any disclaimer, the term of this patent is extended or adjusted under 35 U.S.C. 154(b) by 418 days.

(21) Appl. No.: 12/028,488

(22) Filed: Feb. 8, 2008

(65) Prior Publication Data
US 2008/0191678 A1 Aug. 14, 2008

(30) Foreign Application Priority Data
Feb. 8, 2007 (EP) .................................. 07002759

(51) Int. Cl.
H02M 1/15 (2006.01)
H02M 7/217 (2006.01)
(52) U.S. Cl. ............................ 363/45; 363/89; 323/222
(58) Field of Classification Search ................. 323/222, 323/282; 363/44–46, 89
See application file for complete search history.

(56) References Cited

U.S. PATENT DOCUMENTS

| 4,518,935 | A | * | 5/1985 | van Roermund | ............ 333/173 |
| 4,932,041 | A | | 6/1990 | Eiberger et al. | |
| 4,940,929 | A | * | 7/1990 | Williams | .................... 323/222 |
| 5,502,370 | A | | 3/1996 | Hall et al. | |
| 5,565,761 | A | | 10/1996 | Hwang | |
| 6,140,777 | A | | 10/2000 | Wang et al. | |
| 7,031,173 | B2 | | 4/2006 | Feldtkeller | |
| 7,292,013 | B1 | * | 11/2007 | Chen et al. | ................... 323/222 |
| 7,301,787 | B2 | * | 11/2007 | Wu et al. | ....................... 363/39 |
| 7,397,678 | B2 | | 7/2008 | Frank et al. | |
| 2006/0098763 | A1 | * | 5/2006 | Meyer | ......................... 375/323 |

FOREIGN PATENT DOCUMENTS

| DE | 21 58 105 | 5/1973 |
| DE | 3722328 A1 | 1/1989 |
| DE | 10355670 B4 | 12/2005 |
| DE | 102004033354 A1 | 2/2006 |

OTHER PUBLICATIONS

Datasheet Version 1.2, Feb. 2006, ICB1FL02G, "Smart Ballast Control IC for Fluorescent Lamp Ballasts", Power Management and Supply, Infineon Technologies AG, pp. 1-37.
Aleksandar, Prodic et al., "Self-Tuning Digitally Controlled Low-Harmonic Rectifier Having Fast Dynamic Response", IEEE Transactions on Power Electronics, IEEE Service Center, vol. 18, No. 1 (Jan. 2003).
Aleksandar, Prodic et al., "Self-Tuning Digital Comb Filter for PFC Applications", Colorado Power Electronics Center, pp. 220-225 (2002).

* cited by examiner

Primary Examiner—Jeffrey L Sterrett
Assistant Examiner—Fred E Finch, III
(74) Attorney, Agent, or Firm—Dicke, Billig & Czaja, PLLC

(57) ABSTRACT

A switch-mode converter. One embodiment provides an inductive energy storage element. A rectifier arrangement is coupled to the inductive energy storage element for providing an output voltage. A switching arrangement regulates the inductive energy storage element on the basis of a control signal. A controller arrangement is configured to generate the control signal on the basis of the output voltage. The controller arrangement has a discrete-time band rejection filter and a frequency measuring arrangement.

18 Claims, 5 Drawing Sheets

SWITCH-MODE CONVERTER

CROSS-REFERENCE TO RELATED APPLICATIONS

This Utility Patent Application claims priority to European Patent Application No. 07 002 759.4, filed Feb. 8, 2007, which is incorporated herein by reference.

BACKGROUND

A power factor correction circuit is usually in the form of a step-up converter and includes an inductive storage element, a rectifier arrangement, connected to the inductive storage element, for providing an output voltage, and a switching arrangement connected to the inductive storage element. The switching arrangement regulates the current draw by the inductive storage element on the basis of the output voltage and is connected up such that the storage element periodically draws energy via input terminals and is thereby magnetized, and then outputs the drawn energy to the rectifier arrangement and is thereby demagnetized.

To regulate the power consumption, and hence the output voltage, a power factor controller of this kind generates a control signal which is dependent on the output voltage and which determines particularly the time periods for the magnetization phases of the inductive storage element.

The input voltage for a power factor controller is usually a rectified mains voltage and therefore has a voltage profile in the form of a magnitude of a sign wave. In the case of a power factor controller, the current draw will ideally be regulated such that a mean value for an input current is proportional to the applied input voltage. The power consumption is then proportional to the square of the input voltage and has a sinusoidal profile at a frequency which corresponds to twice the mains frequency. This time-variant power consumption results in a ripple in the output voltage available at the output of the rectifier arrangement, which is higher the smaller the dimensions of an output capacitor in the rectifier arrangement for cost reasons.

To prevent such a ripple in the output voltage from influencing the regulation of the current draw or power consumption, it is known practice to provide a band rejection filter (notch filter) in the control loop, the band rejection filter filtering out signal components at twice the mains frequency. Considering that mains frequencies differ throughout the world, the band rejection range of the filter needs to be chosen to be of appropriate width, for example in order to safely filter out the 100 Hz ripple in a 50 Hz mains and the 120 Hz ripple in a 60 Hz mains. However, the properties of such a filter worsen in terms of damping and group delay time as the width of the band rejection filter increases.

Furthermore, digital filters require a sufficiently accurate clock for sampling the signal which is to be filtered, since the filter characteristic is otherwise subject to the tolerances of the clock signal.

The ripple in the output voltage can also be eliminated by averaging the output voltage over a given time window in order to regulate the power consumption. However, this slows down the regulation and adversely affects the switch-mode converter's ability to react rapidly to sudden load changes at the output.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
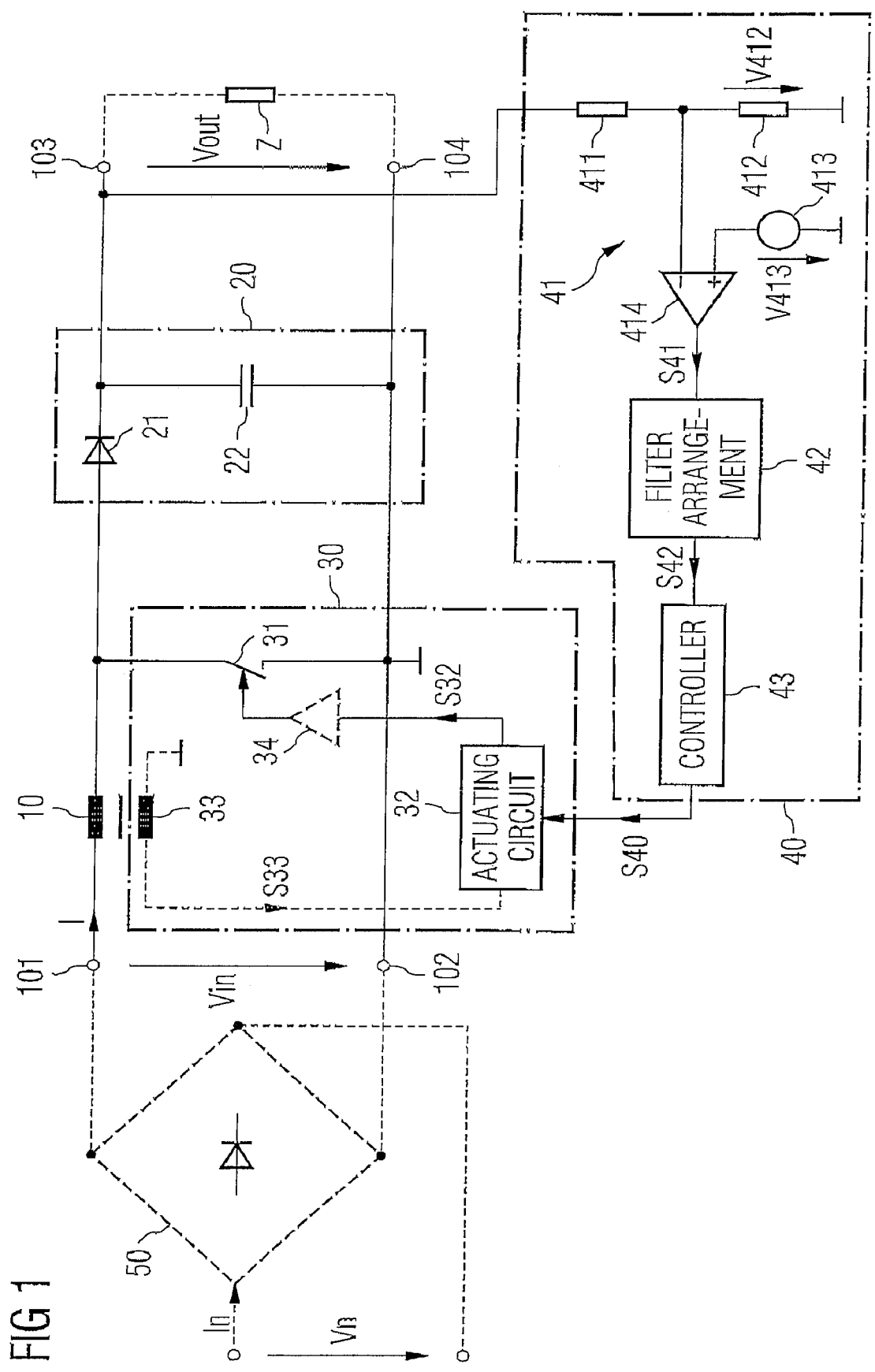
FIG. 1 illustrates one embodiment of an inventive switch-mode converter which is in the form of a step-up converter and which has a feedback path with an adaptively adjustable filter arrangement having a band rejection filter.

FIG. 1 illustrates one embodiment of a switch-mode converter. The switch-mode converter illustrated is in the form of a step-up converter and has input terminals 101, 102 for applying an input voltage Vin, an inductive storage element 10 and a rectifier arrangement 20 connected to the inductive storage element 10. The inductive storage element 10 and the rectifier arrangement 20 are in this context connected in series with one another between the input terminals 101, 102. In the example illustrated, the rectifier arrangement 20 has a series circuit containing a rectifier element 21, for example a diode, and a capacitive storage element 22, for example a capacitor. An output voltage Vout from the switch-mode converter for powering a load Z (illustrated in dashes) can be tapped off on output terminals 103, 104 of the rectifier arrangement 20. In the example illustrated, this output voltage Vout corresponds to a voltage across the capacitive storage element 22 in the rectifier arrangement 20.

To regulate a current draw by the inductive storage element 10, hence to regulate the power consumption via the input terminals 101, 102 and hence to regulate the output voltage Vout of the switch-mode converter, a switching arrangement 30 is provided which is designed to periodically magnetize the inductive storage element 10, which is in the form of a storage inductor, for example, during a respective magnetization period and then to demagnetize it for a demagnetization period. To this end, the switching arrangement 30 has a switching element 31 which is connected in series with the inductive storage element 10 between the input terminals 101, 102 and which is connected in parallel with the rectifier arrangement 20. When the switching element 31 is on or closed, the input voltage Vin is applied across the inductive storage element 10, the inductive storage element draws energy via the input terminals 101, 102 and is thereby magnetized. When the switching element 31 is subsequently off or open, the inductive storage element 10 outputs the previously drawn energy to the rectifier arrangement 20 and is thereby demagnetized.

To actuate the switching element 31, the switching arrangement 30 has an actuating circuit 32 which generates an actuating signal S32, in accordance with which the switching element 31 is turned on and off. The switching element 31 may particularly be in the form of a MOS transistor, for example in the form of a MOSFET or IGBT. In this case, a load path or drain-source path in such a MOS transistor is connected in series with the inductive storage element 10, and a control connection or gate connection of this MOS transistor is supplied with the actuating signal S32 for turning on and off. Optionally, the control connection of the switching element 31 may have a driver circuit 34 connected upstream of it which is used to convert signal levels of the actuating signal S32 to signal levels which are suitable for actuating the switching element.

The actuating circuit 32 actuates the switching element 31 periodically, with the switching element 31 being turned on for a magnetization period and then turned off for a demagnetization period during each actuation period. In this context, the demagnetization period denotes the period of time between the switching element 31 being turned off and the inductive storage element 10 being fully demagnetized. In the case of this switch-mode converter, a control signal S40 supplied to the actuating circuit 32 determines the turned-on period of the switch or the magnetization period during each actuation period, and hence the power consumption of the switch-mode converter. The actuating circuit 32 may be a conventional actuating circuit for a switch in a step-up converter, which means that it is possible to dispense with further explanations regarding the implementation of such an actuating circuit.

The actuating circuit 32 may particularly be designed to operate the step-up converter in delta current mode, which is also referred to as operation with discontinuous current draw (discontinuous conduction mode DCM), or in trapezoidal current mode (continuous conduction mode), which is also referred to as operation with continuous current draw.

Figure 2:
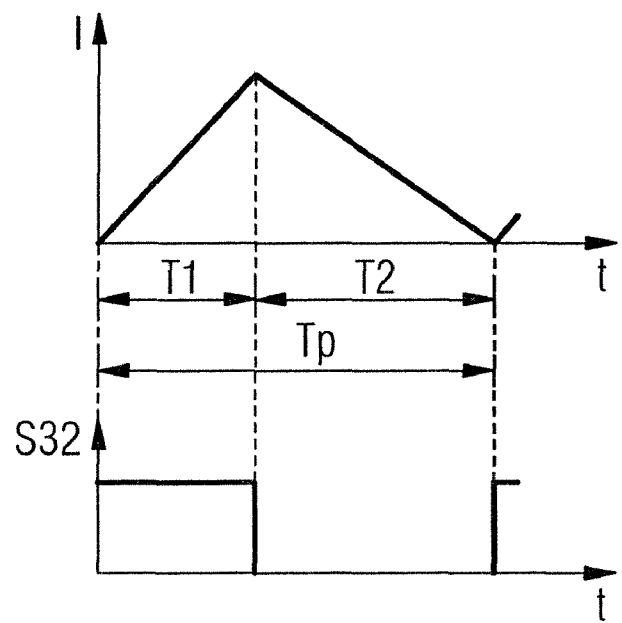
FIG. 2 illustrates the way in which a continuously operated step-up converter works.

FIG. 2 illustrates a time profile for a current I in the storage inductor 10 and for the actuating signal S32 during an actuation period in delta current mode. For the purposes of the explanation, it is assumed for the illustration in FIG. 2 that the switching element 31 is on when the actuating circuit S32 is at a high level and is off when this actuating signal is at a low level.

Referring to FIG. 2, each actuation period Tp includes a magnetization period T1, which corresponds to the turned-on period of the switching element 31, and a demagnetization period following the magnetization period T1, during which the inductor is fully demagnetized and which corresponds to the turned-off period of the switching element 31. In this context, the switching element 31 is turned on again at the end of the demagnetization period, that is to say when the storage inductor 10 is at zero current or demagnetized. The delta current mode requires information about the magnetization state with which the actuating circuit 32 is provided by an auxiliary coil, for example, which is inductively coupled to the storage inductor. A voltage S33 across this auxiliary coil contains information about the current magnetization state of the storage inductor 10 and hence about times at which the inductor 10 is respectively fully demagnetized.

Figure 3:
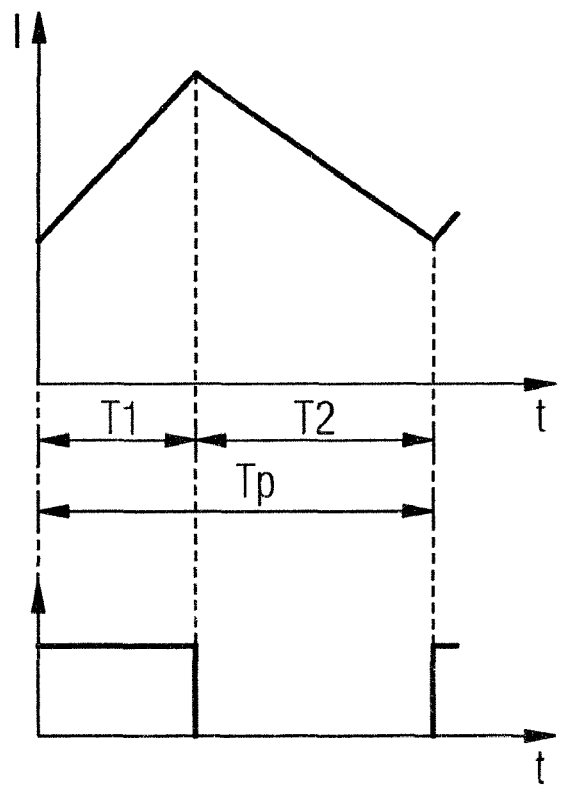
FIG. 3 illustrates the way in which a discontinuously operated step-up converter works.

In trapezoidal current mode, for which the signal profiles in FIG. 3 are illustrated, the switching element 31 is turned on again during the demagnetization phase, before the storage inductor is actually fully demagnetized. For instantaneous values of the input voltage Vin which are not equal to zero, the input current does not fall to zero with this type of actuation—in contrast to the delta current mode. In this case, the quality of the current profile corresponds to that of the current profile in FIG. 2, with the difference that the current does not start to rise from zero at the start of the magnetization period and does not fall to zero during the demagnetization period.

With both previously explained types of operation, a currently drawn power P is proportional to the square of the input voltage, that is to say:

$$P \sim V_{in}^2 \quad (1).$$

The step-up converter illustrated in FIG. 1 is operated as a power factor correction circuit (power factor controller, PFC). A power factor controller of this kind is a step-up converter which is supplied with a periodically varying voltage as input voltage Vin and which generates a DC voltage as output voltage Vout. In this case, the input voltage Vin is a voltage in the form of the magnitude of a sine wave, for example, which voltage is generated by using a bridge rectifier 50 from a sinusoidal mains voltage Vn for example.

To minimize the reactive power to be drawn from the mains, such power factor controllers have the requirement that the input current, or a mean value of the input current, is at least approximately proportional to the input voltage Vin. In delta current mode, this is assured when the magnetization period is the same for successive actuation periods and changes only slowly in comparison with the period duration of the mains voltage. The magnetization period T1 is set by the actuating circuit 32 on the basis of the control signal S40 in this case. In the case of a step-up converter, the magnetization period T1 is the parameter for setting the power consumption and hence for regulating the output voltage Vout. If the output voltage falls on account of increased power consumption by the load then the control signal S40 is used to increase the turned-on period or magnetization period in order to increase the power consumption and thereby to counteract a fall in the output voltage.

The condition that the input current needs to be at least approximately proportional to the input voltage is assured, referring to equation (7), for a discontinuously operated switch-mode converter when the magnetization period is constant for a number of successive actuation periods and changes only slowly in comparison with the period duration of the mains voltage Vn, and when the proportionality factor p is likewise constant for a number of successive actuation periods and changes only slowly in comparison with the mains voltage Vn. In a discontinuously operated switch-mode converter, the magnetization period T1 and the proportionality factor p are parameters for changing the power consumption and hence for regulating the output voltage. If the output voltage rises on account of reduced power consumption by the load Z, for example, then the magnetization period is reduced and/or the waiting time is extended, for example, in order thereby to reduce the power consumption and counteract a rise in the output voltage. In the case of discontinuous operation, the actuating circuit 32 sets the magnetization period T1 and the proportionality factor on the basis of the control signal S40, the proportionality factor changing in processes, for example, as the control signal changes, while the magnetization period changes continually.

Referring to equations (4) and (7), the power consumption is proportional to the square of the input voltage Vin. In the case of a sinusoidal mains voltage, the power consumption therefore has a sinusoidal profile at a frequency which corresponds to twice the mains frequency. These periodic fluctuations in the power consumption are compensated for by the rectifier arrangement 20 in order to provide a DC voltage as output voltage Vout at the output 103, 104. Depending on the capacitance value of the output capacitor 22, however, this DC voltage Vout has a periodic signal at twice the mains frequency overlaid on it. This signal is subsequently called the hum signal, and its frequency is called the hum frequency.

To generate the control signal S40 regulating the power consumption, the switch-mode converter has a controller arrangement 40 which is supplied with the output voltage Vout. In the example illustrated, this controller arrangement 40 includes an error amplifier 414, which generates an error signal or difference signal S41. This error signal S41 is a measure of an instantaneous discrepancy between the output voltage Vout and a nominal value. To generate the error signal S41, the error amplifier 414 is supplied with an output voltage V412 divided down by a voltage divider 411, 412 and with a reference signal V413, provided by a reference voltage source 413, which represents the nominal value. In the case of the switch-mode converter illustrated, the error signal S41 corresponds to a difference between the reference voltage V413 and the divided-down output voltage V412 and carries a hum signal, in line with the output voltage Vout. This error signal S41 is supplied to a filter arrangement 42 having a band rejection filter, which is designed to filter out the hum signal and to provide a filtered error signal S42 at its output. The filtered error signal S42, which ideally no longer has a hum signal, is supplied to a controller 43 which generates the control signal S40 from the filtered error signal S42. This controller 43 may have a proportional response, that is to say may generate the control signal S40 on the basis of the instantaneous value of the filtered error signal S42, may have an integral response, that is to say may generate the control signal S40 on the basis of the filtered error signal S42 considered over a prescribed time window in the past, or may have a proportional-integral response.

The filter arrangement 42 has a filter response which can be adaptively matched to the hum frequency of the hum signal overlaid on the error signal S41, in order to filter out the hum signal in optimum fashion when the band rejection of the band rejection filter which the filter arrangement contains is as narrow as possible.

Figure 4:
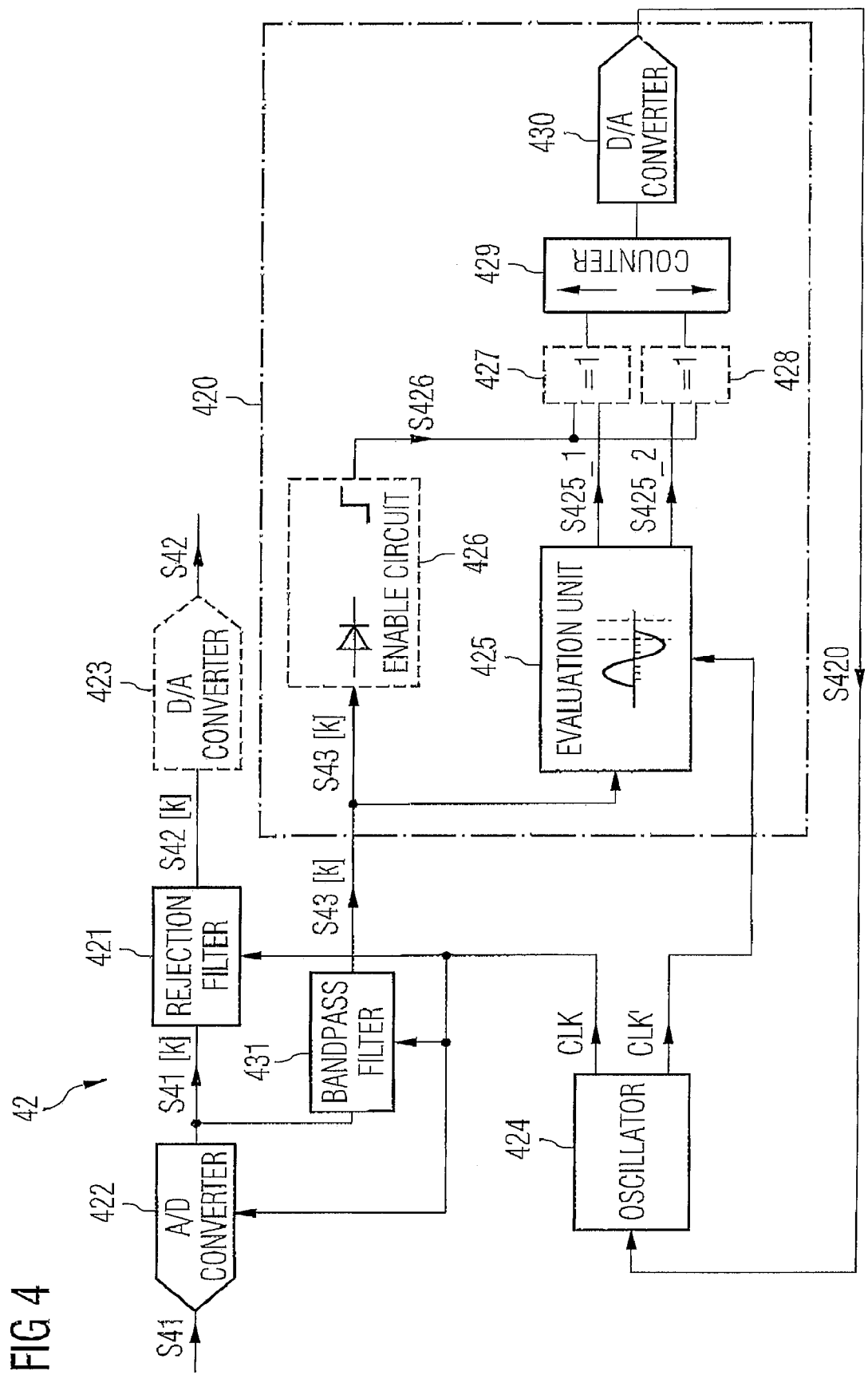
FIG. 4 illustrates an implementation example of the adaptive filter arrangement.

One embodiment of an adaptive filter arrangement of this kind is illustrated in FIG. 4. This filter arrangement has an analog/digital converter 422 which is supplied with the error signal S41 and which samples the error signal S41 at the rate of a clock signal CLK. The output of the converter 422 provides a signal train which corresponds to samples of the error signal S41 and which is subsequently referred to as the discrete-time error signal S41[k]. This discrete-time error signal S41[k] is applied to a band rejection filter 421 which filters the sampled error signal S41[k] and provides a first filter signal S42[k], which is subsequently also referred to as the band rejection filtered error signal. The band rejection filter 421 is designed to filter out a periodic signal component from the sampled error signal S41[k] and may be either in the form of an FIR (Finite Impulse Response) filter or in the form of an IIR (Infinite Impulse Response) filter. The band rejection filtered error signal S42[k] can be output directly as an output signal from the filter arrangement 42 if the downstream controller 43 is likewise in the form of a discrete-time controller. Optionally, it is possible for the band rejection filtered error signal S42[k] to be converted into an analog signal S42 by using a digital/analog converter 422 and for the analog signal to be output at the output of the filter arrangement 42.

For a given band rejection characteristic of the discrete-time band rejection filter 421, the filter result is definitively dependent on the sampling frequency. The frequency of the signal components which are filtered from the error signal S41 by the band rejection filter 421 in order to obtain the band rejection filtered error signal S42[k] is dependent on the frequency at which the error signal S41 is sampled. To be able firstly to use a band rejection filter with a narrow rejection band but secondly to be able to filter out or damp the hum signal in optimum fashion, the filter arrangement illustrated in FIG. 4 has the provision for the frequency of the hum signal overlaid on the error signal S41 to be detected by a frequency measuring arrangement 420 and for the clock frequency of the clock signal CLK to be set on the basis of the measurement result.

To this end, the frequency measuring arrangement generates a clock control signal S420 which is supplied to an oscillator 424. This oscillator, which is in the form of a voltage controlled oscillator, for example, provides the clock signal CLK at the frequency which is dependent on the clock control signal S420.

To generate the clock control signal S420, the frequency measuring arrangement 420 may be supplied with the sampled error signal S41[k] or with a signal which is dependent on the sampled error signal S41[k]. The arrangement illustrated is optionally provided with a bandpass filter 431 which is supplied with the error signal S41[k] and whose output provides a bandpass filtered error signal S43[k] which is supplied to the frequency measuring arrangement 420. The filter characteristic of a bandpass filter 431 used to generate the bandpass filtered error signal S43[k] is complementary to the filter characteristic of the band rejection filter, which means that the bandpass filtered error signal S43[k] represents the signal component of the error signal S41[k] which is filtered out by the band rejection filter. The frequency measuring arrangement 420 has an evaluation unit 425 which is supplied with the bandpass filtered error signal S43[k] and which ascertains the frequency of the bandpass filtered error signal S43[k] relative to the clock frequency of the clock signal CLK. To this end, the evaluation unit 425 is supplied with a second clock signal CLK' in the example. This second clock signal CLK' has a fixed relationship with the first clock signal CLK. In particular, it may be identical to the first clock signal CLK or its frequency may be proportional to that of the first clock signal CLK. In addition, the second clock signal CLK' may be in phase with the first clock signal CLK or phase shifted relative to this first clock signal CLK.

The frequencies of the clock signals CLK, CLK' may be lower than an internal clock rate generated in the voltage controlled oscillator on the basis of the signal S420. In this case, the oscillator has a frequency divider (not illustrated) integrated in it which divides down the internally generated clock signal. In this context, the frequency of this internal clock signal may be in the MHz range, while the frequency of the first and second clock signals CLK, CLK' is in the single-figure kHz range, for example.

For the explanation which follows, it is assumed that the discrete-time bandpass filtered error signal S43[k] corresponds to the sampled hum signal. This signal S43[k] is therefore a periodic signal with a zero mean value and at a frequency which corresponds to the hum frequency. Even if it is assumed that the center of the passband of the bandpass filter 431 and that of the rejection band of the band rejection filter 421 are not matched to the hum frequency exactly during an adaptation phase, it can nevertheless be assumed that at least intermittently signal components which are at the hum frequency and which are of sufficiently high amplitude will pass through the bandpass filter 431.

To ascertain a ratio between the hum frequency and the clock frequency $f_{CLK}$, the evaluation circuit 425 ascertains the number of clock periods of the second clock signal CLK' within a prescribed number of periods of the sampled hum signal S43[k], for example. The start or the end of a period of the hum signal is recognized by the actuating circuit 425 from the fact that there is a change in the polarity of the samples from negative values to positive values, for example.

In the case of the frequency measuring arrangement illustrated in FIG. 4, a discrete-time clock control signal is available at the output of a counter 429 actuated by the evaluation circuit 425. This discrete-time clock control signal is supplied to a digital/analog converter 430 which provides the analog clock control signal S420. To control the counter 429, the actuating circuit 425 generates two control signals S425_1, S425_2. The first control signal S425_1 is used to increment the counter 429, while the second control signal S425_2 is used to decrement the counter 429. In this context, the actuating circuit 425 is designed to generate a signal level for the first control signal S425_1 which is suitable for incrementing the counter 429 if the ratio of the clock frequency $f_{CLK}$ to the hum frequency $f_B$ or the ratio of the period duration $T_B$ of the hum signal and the period duration $T_{CLK}$ of the clock signal is lower than a prescribed limit value. In this case, the counter 429 is incremented in order to increase the clock frequency of the clock signal CLK via the clock control signal S420. Accordingly, the evaluation circuit 425 is designed to generate a signal level from the second control signal S425_2 which is suitable for decrementing the counter 429 if the ratio of the frequency $f_{CLK}$ of the clock signal and the frequency $f_B$ of the hum signal or of the period duration $T_B$ of the hum signal and the period duration $T_{CLK}$ of the clock signal is higher than a prescribed second limit value.

The counter can be incremented and decremented in respective identical processes. Furthermore, it is also possible to set the value by which the counter 429 is respectively incremented or decremented on the basis of how greatly the ratio of the clock frequency $f_{CLK}$ to the hum frequency $f_B$ differs from a desired range of values. The way in which the evaluation circuit 425 and the counter 429 work to generate the clock control signal S420 can be summarized in brief as follows:

Increment counter 420 if $f_{CLK}/f_B < S1$   (8a)

Decrement counter 420 if $f_{CLK}/f_B > S2$   (8b).

In this case, S1 and S2 denote limit values for a range of values which is intended to contain a ratio of the clock frequency to the hum frequency. The clock frequency $f_{CLK}$ is in this case adjusted using the clock control signal S420 until this condition has been met.

Optionally, the frequency measuring arrangement illustrated in FIG. 4 has an enable circuit 426, 427, 428 which allows the counter 429 to be incremented and decremented, and hence the clock control signal S420 to be changed, only if the amplitude of the bandpass filtered error signal or hum signal S43[k] is greater than a prescribed amplitude threshold value. To this end, the enable circuit includes a peak value rectifier and comparator arrangement 426 which compares the peak value of the hum signal with the prescribed threshold value and which generates an enable signal S426 only if this peak value is above the amplitude threshold value. In the example illustrated, the enable circuit also includes logic gates 427, 428, in the form of AND gates, which are connected upstream of the incrementing and decrementing inputs of the counter 429 and which are supplied with the enable signal S426 and with the first and second control signals S425_1, S425_2. In the case of this enable circuit, the control signals S425_1, S425_2 pass through the logic gates 427, 428, in order to increment or decrement the counter 429, only if the enable signal S426 assumes an enable level, in the present case a high level. The purpose of the enable circuit 426 is to allow adaptation of the filter properties using the clock frequency $f_{CLK}$ of the sampling clock only if there is a hum signal with a sufficiently high amplitude. This is based on the consideration that a low power consumption by a load connected to the output and an associated low-amplitude hum signal present the risk of erroneous frequency measurement for the hum signal, which could result in the filter arrangement being adjusted incorrectly. Furthermore, a low-amplitude hum signal has only little effect on the regulation of the power consumption, which means that it is possible to dispense with exact filtering out of a low-amplitude hum signal of this kind.

Figure 5:
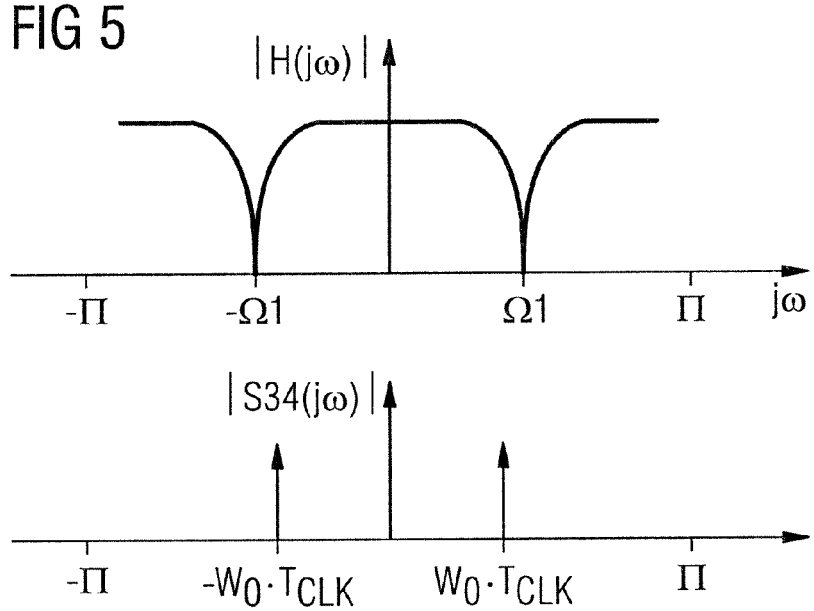
FIG. 5 illustrates frequency responses for a bandpass-filtered error signal and for a transfer function for the band rejection filter in order to explain the way in which the adaptive filter arrangement works.

The way in which the filter arrangement illustrated in FIG. 4 works becomes clear with reference to FIG. 5, which illustrates the normalized transfer function of a band rejection filter and the frequency spectrum of the sampled hum signal S43[k] by way of example, it being assumed for the purposes of the explanation that the hum signal is a cosine signal at an angular frequency $\omega_0$, with $\omega_0 = 2\Pi \cdot f_0$, where $f_0$ is the hum frequency. For the purposes of the explanation, it will be assumed that the band rejection filter 421 has band rejection ranges with normalized center frequencies $\Omega1$ and $-\Omega1$. Signal components of the sampled hum signal are in the frequency spectrum at normalized frequencies of $-\omega_0 \cdot T_{CLK}$ and $\omega_0 \cdot T_{CLK}$. As can be seen directly from the frequency spectrum of the hum signal S43[k] relative to the response of the band rejection filter, the nonzero spectral components of the hum signal can be shifted to the rejection bands of the band rejection filter by adjusting the clock frequency $f_{CLK}$ or the clock period $T_{CLK}$, naturally assuming that the Nyquist criterion is met, according to which the sampling frequency needs to be at least twice as high as the frequency of the sampled signal. In the present case, that is to say:

$$f_{CLK} \geq 2 \cdot f_0.$$

Figure 6:
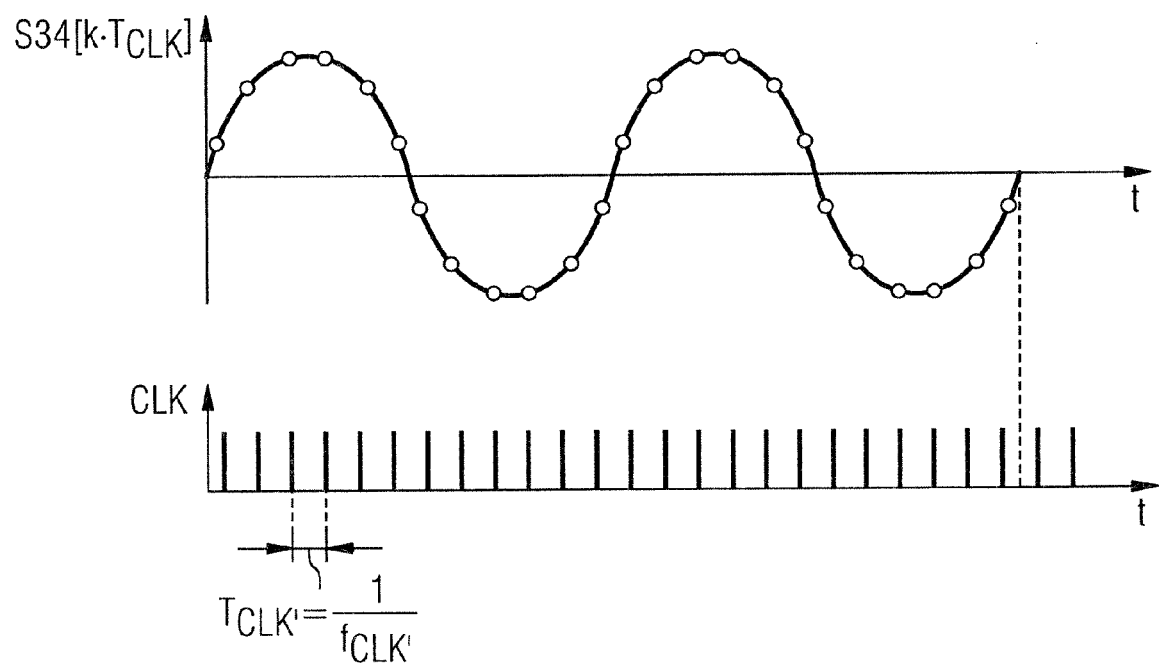
FIG. 6 illustrates the way in which an evaluation circuit which the frequency measuring arrangement contains works using signal profiles.

The way in which the evaluation circuit 425 works is explained below with reference to FIG. 6. FIG. 6 illustrates the time profile of the hum signal sampled at the clock frequency $f_{CLK}$ and the time profile of the clock signal CLK. For this explanation, it is assumed that the clock signal CLK' supplied to the evaluation circuit 425 corresponds to the clock signal CLK used to sample the analog signals. The evaluation circuit 425 ascertains the number of clock periods of the clock signal CLK within a prescribed number of periods of the hum signal, in the example within two periods of the hum signal. The number of clock periods of the clock signal which are within the prescribed number of periods of the hum signal directly provides a measure of the ratio of the clock frequency $f_{CLK}$ to the hum frequency $f_B$ and can be used directly to generate the control signals S425_1, S425_2 for incrementing and decrementing the counter 429. If this number of clock periods is below a prescribed limit value, the ratio of the clock frequency $f_{CLK}$ to the hum frequency $f_B$ is below the first limit value, and the clock frequency needs to be increased. If this number is above a further prescribed threshold value, the ratio of the clock frequency $f_{CLK}$ to the hum frequency $f_B$ is above the second limit value, and the clock frequency $f_{CLK}$ needs to be reduced accordingly.

Figure 7:
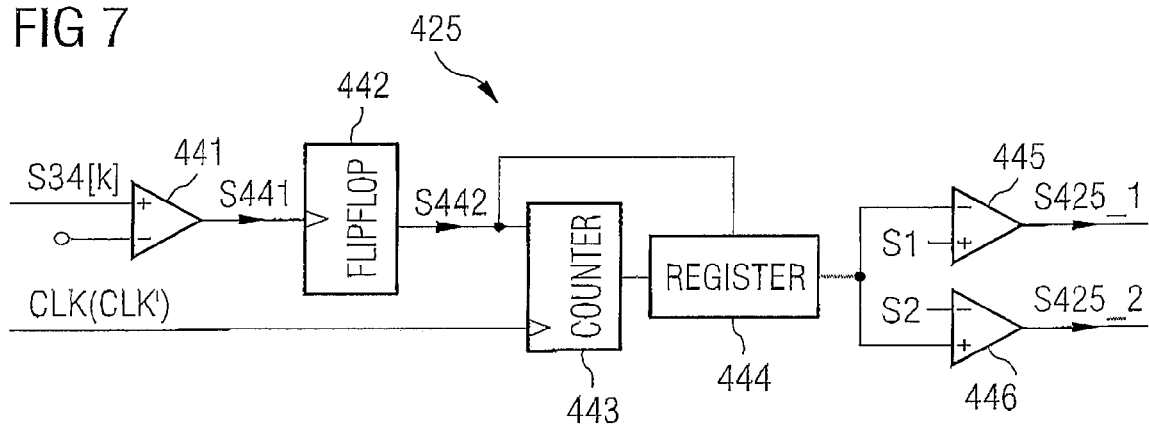
FIG. 7 illustrates one embodiment of the evaluation circuit.

An implementation example for an evaluation circuit 425 is illustrated in FIG. 7. This evaluation circuit has a comparator 441 which is supplied with the sampled hum signal S43[k] and which is used to detect a level change in the hum signal. To this end, the individual samples of the hum signal with a zero mean value are compared with zero in order to detect a level change in the hum signal. An output signal S441 from this comparator 441 is supplied to a flipflop 442, which changes its state whenever the comparison signal S441 rises from a low level to a high level, that is to say with every new period of the hum signal. This "toggle" flipflop 442 has a counter 443 connected downstream of it whose clock input is supplied with the clock signal CLK or with the second clock signal CLK' and which is enabled by an output signal S442 from the toggle flipflop. In the arrangement illustrated, this counter is enabled at the start of every second period of the hum signal and counts the clock pulses in the clock signal CLK or in the second clock signal CLK' during the period of the hum signal. The counter has a register 444 connected downstream of it which stores the counter value available at an output of the counter 443 at the end of every evaluation period, i.e. upon a falling edge of the flipflop signal S442. The counter value stored in the register 444, which value is a direct measure of the ratio of the clock frequency to the hum frequency, is compared with the first and second threshold values S1, S2 by using two comparators 445, 446 connected downstream of the register 444. The outputs of the comparators 445, 446 provide the control signals S425_1, S425_2. The first control signal S425_1, which, referring to FIG. 4, implements the counter, assumes a high level when the number of clock pulses ascertained during the evaluation period is lower than a first threshold value S1. The second clock signal S4252, which, referring to FIG. 4, decrements the counter, assumes a high level when the number of clock pulses ascertained within the evaluation period is higher than a second threshold value S2.

Figure 8:
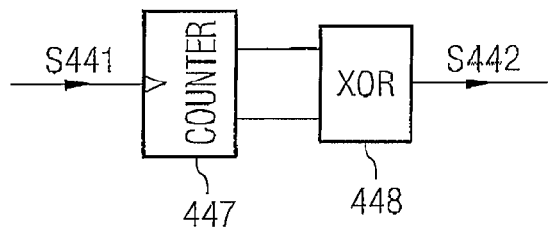
FIG. 8 illustrates details of a modification of the evaluation circuit illustrated in FIG. 7.

It is possible to evaluate the number of clock pulses over a plurality of periods of the hum signal if the flipflop 442 is replaced by a counter whose clock input is supplied with the comparison signal S441 and which enables the counter 443 connected downstream. Evaluation over two actuation periods of the hum signal can be achieved using a two-bit counter, for example, whose bits, when logically combined by an XOR gate, form the enable signal S442. In this arrangement, the counter 443 is enabled whenever the counter reading of the upstream counter is one or two. Such a counter arrangement as a replacement for the flipflop 442 is illustrated in FIG. 8, in which the reference symbol 447 denotes the counter and the reference symbol 448 denotes the downstream XOR gate.

Figure 9:
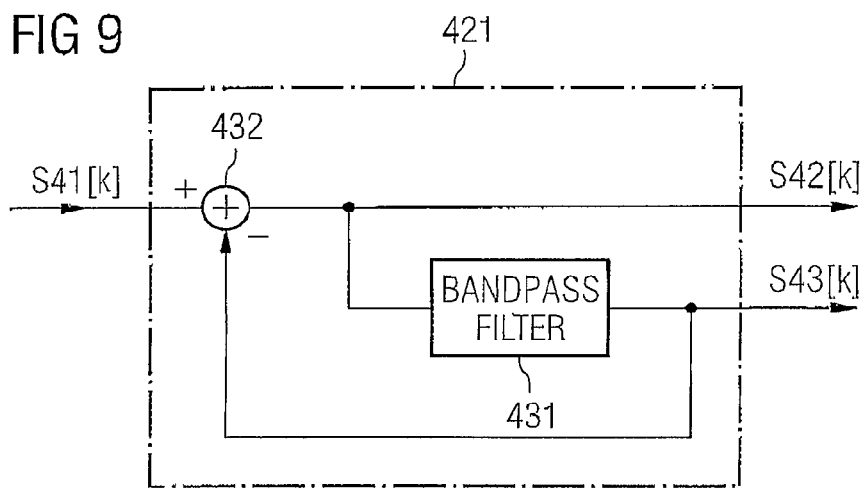
FIG. 9 illustrates an implementation example of a band rejection filter and a bandpass filter in the filter arrangement.

The filter arrangement 42 illustrated in FIG. 4 contains a band rejection filter for generating the band rejection filtered error signal S42[k] and a bandpass filter 431 for generating the bandpass filtered error signal S43[k]. The functionality of the band rejection filter 421 and of the bandpass filter 431, which have complementary transfer functions, can easily be achieved using a single bandpass filter, as explained below with reference to FIG. 9.

In this embodiment, the bandpass filter 431 is part of the band rejection filter 421 providing the band rejection filtered error signal S42[k]. In this embodiment, the band rejection filter 421 also has a subtractor 432 which is supplied with the error signal S41[k] and with a bandpass filtered signal S43[k] available at the output of the bandpass filter 431 as input signals. The output signal from the subtractor 432 forms the band rejection filtered error signal S42[k] and is also supplied to the input of the bandpass filter 431, which in this embodiment has a high gain at its resonant frequency. Ideally, the gain of the bandpass filter at its resonant frequency is infinite and, in a digital implementation, is dependent on rounding errors in the arithmetic and logic units used in the arrangement.

If the filter input signal S41[k] has frequency components at the resonant frequency of the bandpass filter 431 then the high gain of the bandpass filter 431 means that its output produces a signal level which roughly corresponds to the signal level of the signal component at the resonant frequency in the input signal S41[k], but this signal component has an inverse sign or an opposite phase, while the signal level of this signal component in the band rejection filtered signal S42[k] is significantly reduced. In the filter arrangement illustrated, the combination of subtractor 432 and bandpass filter 431 with very high gain acts like a band rejection filter with a gain factor of approximately unity, so that the signal S43[k] at the output of the bandpass filter 431 corresponds to a bandpass filtered error signal.

If the frequency of the input signal S41[k] is a little beside the resonant frequency of the bandpass filter then in the steady state the output of the bandpass filter 431 produces an oscillation whose amplitude still largely corresponds to the signal amplitude of the input signal S41[k] and whose phase differs slightly from the opposite phase relative to the input signal S41[k]. In this case, the input signal for the bandpass filter 431 or the band rejection filtered signal S42[k] assumes a higher signal level than for excitation exactly at the resonant frequency. In terms of its bandpass response, which affects the bandpass filtered signal S43[k], the filter thus has a much broader filter characteristic than in terms of its band rejection response, which affects the band rejection signal S42[k]. As a result, as described previously, a signal of sufficiently high amplitude for frequency setting is available at the bandpass output S43[k] even if the filter is not yet exactly tuned to the hum frequency.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A switch-mode converter comprising:
   an inductive energy storage element coupled to a rectifier, providing an output voltage;
   a switching arrangement configured to receive a control signal that regulates the inductive energy storage element;

a controller configured to generate the control signal based on the output voltage, comprising a discrete time band rejection filter and a frequency measuring arrangement;

the discrete-time band rejection filter is configured to receive an error signal, which is dependent on the output voltage and is sampled in accordance with a clock signal, and generates a first filter signal on which the control signal is dependent;

the frequency measuring arrangement configured to receive the error signal and to ascertain a frequency for a periodic signal component of the error signal and to generate a clock control signal dependent on this frequency; and the frequency measuring arrangement comprising an evaluation circuit, supplied with the sampled error signal or with a signal dependent on this signal and with the clock signal or with a second clock signal dependent on the clock signal, and designed to ascertain a ratio between a period duration for a periodic signal component of the error signal and a period duration for the clock signal.

2. The converter of claim 1, the controller comprising:

a controllable oscillator configured to receive the clock control signal and generate the clock signal on the basis of the clock control signal.

3. The converter of claim 2, wherein the controller is supplied with the first filter signal and provides the control signal.

4. The converter of claim 3, wherein the controller is a proportional controller or a proportional-integral controller.

5. The converter of claim 1, wherein the frequency measuring arrangement has a bandpass filter supplied with the sampled error signal or with the first filter signal and provides a second filter signal, and the evaluation signal is supplied with the second filter signal; and wherein the evaluation circuit generates at least one control signal on the basis of the ratio between the period duration of the periodic signal component of the error signal and the period duration of the clock signal, and the at least one control signal is supplied to a clock control signal generation circuit which provides the clock control signal on the basis of the at least one control signal, wherein the clock control signal generation circuit is in the form of a counter which can be incremented and decremented by the at least one control signal.

6. A switch-mode converter comprising:

an inductive energy storage element;

a rectifier arrangement, connected to the inductive energy storage element, with output terminals for providing an output voltage;

a switching arrangement for regulating a current draw by the inductive energy storage element on the basis of a control signal; and a controller arrangement which is designed to generate the control signal on the basis of the output voltage, wherein a discrete-time band rejection filter is supplied with an error signal, which is dependent on the output voltage and is sampled in accordance with a clock signal, and generates a first filter signal on which the control signal is dependent, a frequency measuring arrangement is supplied with the error signal and designed to ascertain a frequency for a periodic signal component of the error signal and to generate a clock control signal dependent on this frequency, a controllable oscillator is supplied with the clock control signal and generates the clock signal on the basis of the clock control signal, the frequency measuring arrangement comprising: an evaluation circuit, supplied with the sampled error signal or with a signal dependent on this signal and with the clock signal or with a second clock signal dependent on the clock signal, and designed to ascertain a ratio between a period duration for a periodic signal component of the error signal and a period duration for the clock signal.

7. The converter of claim 6, wherein the controller arrangement has a controller supplied with the first filter signal and provides the control signal.

8. The converter of claim 7, wherein the controller is a proportional controller or a proportional-integral controller.

9. The converter of claim 6, wherein the frequency measuring arrangement has a bandpass filter supplied with the sampled error signal or with the first filter signal and provides a second filter signal, and the evaluation circuit is supplied with the second filter signal.

10. The converter of claim 6, wherein the evaluation circuit generates at least one control signal on the basis of the ratio between the period duration of the periodic signal component of the error signal and the period duration of the clock signal, and the at least one control signal is supplied to a clock control signal generation circuit which provides the clock control signal on the basis of the at least one control signal.

11. The converter of claim 10, wherein the clock control signal generation circuit is in the form of a counter which can be incremented and decremented by the at least one control signal.

12. The converter of claim 11, wherein the frequency measuring arrangement has an enable circuit which enables or disables the clock control signal generation circuit on the basis of a signal amplitude of the second filter signal.

13. The converter of claim 6, the band rejection filter comprising:

an input for supplying the sampled error signal and an output for providing the first filter signal;

a subtractor connected downstream of the input and supplied with the error signal and with a feedback signal; and a feedback path having an input connected to the output of the band rejection filter, having a bandpass filter and having an output which provides the feedback signal.

14. The converter of claim 13, wherein the bandpass filter has a resonant frequency and a gain much greater than unity at the resonant frequency.

15. The converter of claim 13, wherein the feedback signal from the band rejection filter is used as a second filter signal for the frequency measuring arrangement.

16. A switch-mode converter comprising:

an inductive energy storage coupled to a rectifier, providing an output voltage;

a switching arrangement configured to receive a control signal that regulates the inductive energy storage element, a controller configured to generate the control signal based on the output voltage, comprising a discrete time band rejection filter and a frequency measuring arrangement, and the frequency measuring arrangement comprising an evaluation circuit, supplied with a sampled error signal or with a signal dependent on this signal and with a clock signal or with a second clock signal dependent on the clock signal, and designed to ascertain a ratio between a period duration for a periodic signal component of the error signal and a period duration for the clock signal.

17. The converter of claim 16, comprising:
the discrete-time band rejection filter is configured to receive an error signal, which is dependent on the output voltage and is sampled in accordance with a clock signal, and generates a first filter signal on which the control signal is dependent.

18. The converter of claim 16, comprising:
the frequency measuring arrangement configured to receive the error signal and to ascertain a frequency for a periodic signal component of the error signal and to generate a clock control signal dependent on this frequency.

* * * * *